(12) United States Patent
Kim et al.

(10) Patent No.: US 9,460,364 B2
(45) Date of Patent: Oct. 4, 2016

(54) METHOD OF EXTRACTING RIDGE DATA AND APPARATUS AND METHOD FOR TRACKING JOINT MOTION OF OBJECT

(71) Applicant: POSTECH ACADEMY-INDUSTRY FOUNDATION, Pohang-si, Gyeongsangbuk-do (KR)

(72) Inventors: Dai Jin Kim, Pohang-si (KR); Yeon Ho Kim, Pohang-si (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 14/562,848

(22) Filed: Dec. 8, 2014

(65) Prior Publication Data

US 2015/0161445 A1    Jun. 11, 2015

(30) Foreign Application Priority Data

Dec. 9, 2013    (KR) .................. 10-2013-0152128

(51) Int. Cl.
*G06K 9/62*    (2006.01)
*G06K 9/00*    (2006.01)

(52) U.S. Cl.
CPC ......... *G06K 9/6204* (2013.01); *G06K 9/00342* (2013.01)

(58) Field of Classification Search
None
See application file for complete search history.

(56) References Cited

U.S. PATENT DOCUMENTS

| | | | | |
|---|---|---|---|---|
| 2008/0212836 A1* | 9/2008 | Fujimura | ........... | G06K 9/00369 382/103 |
| 2011/0199291 A1* | 8/2011 | Tossell | .................... | G06F 3/017 345/156 |
| 2012/0206597 A1* | 8/2012 | Komoto | ................ | G06T 7/2006 348/135 |
| 2013/0293679 A1* | 11/2013 | Gurman | ............. | G06K 9/00362 348/46 |

OTHER PUBLICATIONS

Yeonho Kim, et al; "Human Pose Recognition Using Ridge Data and Data Pruning" Jan. 2013; Computer Science and Engineering, Pohand University of Science and Technology; pp. 698-700.

* cited by examiner

*Primary Examiner* — Nirav G Patel
*Assistant Examiner* — Brian Shin
(74) *Attorney, Agent, or Firm* — Ladas & Parry LLP (57) ABSTRACT

A method of extracting ridge data includes selecting a point in the contour of an object from an image of the object, calculating a chamfer distance of the point in the contour, and determining whether the point in the contour is a ridge point based on relationships between the chamfer distance and chamfer distances of points in the contour adjacent to the point in the contour. A method of tracking a joint motion of an object includes acquiring initial information of the object including information on at least one ridge region representing a distribution of ridge points of the object, and tracking the joint motion of the object from temporally consecutive images of the object based on the initial information.

19 Claims, 7 Drawing Sheets

GRADIENT DESCENT METHOD   PROPOSED METHOD

FIG. 8

METHOD OF EXTRACTING RIDGE DATA AND APPARATUS AND METHOD FOR TRACKING JOINT MOTION OF OBJECT

CLAIM FOR PRIORITY

This application claims priority to Korean Patent Application No. 10-2013-0152128 filed on Dec. 9, 2013 in the Korean Intellectual Property Office (KIPO), the entire contents of which are hereby incorporated by reference.

BACKGROUND

1. Technical Field

Example embodiments of the present invention relate in general to a technology for tracking motion of an object by analyzing images of the object, and more particularly, to a method of extracting ridge data in a method of tracking motion of an object and an apparatus and method for tracking a joint motion of an object.

2. Related Art

Technology for tracking motion of an object plays a major role in kinesiology, human engineering, sports science, and the fields of computer vision, human-computer interaction, etc. Currently used methods of tracking motion of an object may be roughly classified as a tracking-based method and a learning-based method.

In the learning-based method, to estimate a posture of an object, motion of the object is generally defined by classification or regression. Then, training is performed using samples including labels, and the posture of the object is estimated using an acquired training model. However, with the learning-based method, it is impossible to acquire accurate estimation results because the classification enables only a crude estimation of the posture of the object and the regression is severely affected by the surroundings of the object.

On the other hand, in the tracking-based method, a posture of an object is estimated by one-pair matching between a current frame and a previous frame temporally consecutive in a video. This method shows a relatively high degree of precision in posture tracking within a short time.

Although much research is being conducted on tracking of an object's posture, it is difficult in practice to stably and continuously acquire an object's posture using a computer vision. There is a method of attaching markers that enable recognition of an object's major parts and tracking the object's posture based on the markers. However, the method involves special equipment, such as markers and a sensor, in addition to a camera, and thus cannot track an object's motion from general images.

Also, when some parts of an object are covered by other parts and it is not possible to acquire accurate data of the covered parts, image data of the covering parts is required to be removed so as to acquire the data of the covered parts. This is more so for humans. Parts of a human are covered by various clothes and natural motions, and thus tracking of a human's posture is considerably limited.

Due to flexibility of joints, a human body is not fixed in one posture and but is able to take various postures. A human easily senses various postures of a human body with naked eyes, whereas it is not easy for a computer to recognize a particular posture of a human body from images input to an image input device. In addition, since people have slightly different body structures, posture tracking should be performed in consideration of many people's various body structures.

Existing technology for solving these problems includes the aforementioned method of tracking the positions of markers to determine a posture of a human body, and a method of causing a light-and-shade image of a human body to be formed using predetermined lighting and receiving the light-and-shade image through an image input device to determine a posture. The method employing markers involves attaching light sensors on a human body. According to the method, three-dimensional (3D) coordinates of the light sensors are tracked using several cameras to determine a posture of the corresponding person. According to the method of determining a posture of a human body using predetermined lighting, light and shadow of a human body is acquired by an image input device using several lighting fixtures to determine a posture of the human body. These technologies for determining a posture of a human body are mainly applied to sensitive controllers of console game machines and used in martial arts games, dance games, and so on.

However, existing systems for determining a posture of a human body are limited by a specific lighting space or markers attached to a human body, and thus are inconvenient and inappropriate to determine a posture of the human body from general images. This is because it is not possible to measure a posture of a person unless the person moves in the specific lighting space or has markers attached to himself or herself.

SUMMARY

Accordingly, example embodiments of the present invention are proposed to substantially obviate one or more problems of the related art as described above, and provide an apparatus and method for effectively generating multimedia content capable of providing a motion haptic effect.

Example embodiments of the present invention provide an apparatus and method for tracking a joint motion of an object at a high speed by reducing stage-specific search regions of the object with a kinematic model.

Example embodiments of the present invention also provide an apparatus and method for, assuming that data corresponding to an object is separated from images input through a three-dimensional (3D) camera, determining the position of a joint to be tracked based on the separated object data, and enabling collection of much candidate data appropriate for the corresponding part of the object based on a proposed algorithm to acquire accurate skeletal information.

Example embodiments of the present invention also provide a method capable of using a length condition of an object, the probability of a straight surface line, a data slicing technique, etc. to overcome a situation in which many parts of an object are covered by clothes or other parts.

Other purposes and advantages of the present invention can be understood through the following description, and will become more apparent from example embodiments of the present invention. Also, it is to be understood that purposes and advantages of the present invention can be easily achieved by means disclosed in claims and combinations thereof.

In some example embodiments, a method of extracting ridge data in a method of tracking motion of an object includes: selecting a point in a contour of the object from an image of the object; calculating a chamfer distance of the point in the contour; and determining whether the point in the contour is a ridge point based on relationships between the chamfer distance and chamfer distances of points in the contour adjacent to the point in the contour.

Here, the method of extracting ridge data may further include tracking a position of a specific part of the object based on coordinates of a ridge point in one image among temporally consecutive images of the object and a chamfer distance of the ridge point.

Here, a point $X_c$ in the contour satisfying an expression below may be selected according to the relationships between the chamfer distance and the chamfer distances of the points in the contour adjacent to the point in the contour:

$$\frac{\sum_{i=1}^{N} Cham(X_i)}{N} < Cham(X_c) \cdot \delta_R,$$ [Expression]

where $X_c$ is coordinates of the point in the contour, N is a number of points in the contour having a distance of $Cham(X_c)$ from $X_c$, $Cham(X_i)$ is a chamfer distance of a point in the contour indicated by a variable i among the N points in the contour, and $\delta_R$ is a distribution correction factor representing a distribution of chamfer distances.

In other example embodiments, a method of tracking a joint motion of an object includes: acquiring initial information of the object including information on at least one ridge region representing a distribution of ridge points of the object; and tracking the joint motion of the object from temporally consecutive images of the object based on the initial information.

Here, the acquiring of the initial information may include: selecting a point in a contour of the object from an image of the object in a predetermined posture; calculating a chamfer distance of the point in the contour; selecting at least one object ridge point satisfying a predetermined ridge condition of a chamfer distance and a distribution correction factor representing a distribution of chamfer distances among points in the contour; and determining a group consisting of the at least one object ridge point as the at least one ridge region.

Also, a point in the contour satisfying an expression below may be selected under the predetermined ridge condition:

$$\frac{\sum_{i=1}^{N} Cham(X_i)}{N} < Cham(X_c) \cdot \delta_R,$$ [Expression]

where $X_c$ is coordinates of the point in the contour, N is a number of points in the contour having a distance of $Cham(X_c)$ from $X_c$, $Cham(X_i)$ is a chamfer distance of a point in the contour indicated by a variable i among the N points in the contour, and $\delta_R$ is a distribution correction factor representing a distribution of chamfer distances.

Also, the acquiring of the initial information may include finding two linear regression equations representing an upper arm and a fore arm by performing linear regression on object ridge points in an upper arm region and a fore arm region among the at least one ridge region, and determining a cross point of the two linear regression equations as an elbow position.

Also, the acquiring of the initial information may include: finding two linear regression equations representing a thigh and a lower leg by performing linear regression on object ridge points in a thigh region and a lower leg region among the at least one ridge region; determining a cross point of the two linear regression equations as a knee position when an acute angle between crossing angles formed by the two linear regression equations is larger than a predetermined angle; and determining a middle point between coordinates of a hip joint and floor plane coordinates closest to the hip joint coordinates as the knee position when the acute angle is equal to or smaller than the predetermined angle.

Here, the tracking of the joint motion may include: a head tracking operation of determining a position of a head center in a $t^{th}$ image among the temporally consecutive images based on coordinates of at least one head ridge point satisfying a predetermined head condition among the object ridge points; a torso tracking operation of determining torso joint positions in the $t^{th}$ image based on coordinates of at least one torso ridge point satisfying a predetermined torso condition among the object ridge points other than the at least one head ridge point; and a limb tracking operation of determining limb joint positions in the $t^{th}$ image based on coordinates of at least one limb ridge point satisfying a predetermined limb condition among the object ridge points other than the at least one head ridge point and the at least one torso ridge point.

Also, the predetermined head condition may be expressed as at least one equation or inequality relating a displacement of the head center in a $(t-1)^{th}$ image among the temporally consecutive images and a head ridge region in the $t^{th}$ image.

Also, the predetermined torso condition may be expressed as at least one equation or inequality relating a displacement of a torso center in a $(t-1)^{th}$ image among the temporally consecutive images and the head center position in the $t^{th}$ image.

Also, a position of a torso center among the torso joint positions may be determined based on head-shoulder-torso (HST) structure information in the initial information, and the HST structure information may be expressed as distances and angles between the head center, both shoulders, and the torso center Also, positions of both elbows and positions of both knees among the limb joint positions may be determined based on positions of both shoulders and both hip joints, which are upper joints of the elbows and the knees, respectively, and positions of both hands and positions of both feet among the limb joint positions may be determined based on positions of both the elbows and both the knees, which are upper joints of the hands and the feet, respectively.

Also, the predetermined limb condition may be expressed as at least one equation or inequality relating a Euclidean distance and a geodesic distance between the at least one limb ridge point in a region of a lower joint and an upper joint directly above the lower joint.

Further, the limb tracking operation may include, when a number of the at least one limb ridge point satisfying the predetermined limb condition is equal to or smaller than a predetermined number, calculating the limb joint positions based on the initial information, a position of the upper joint in a $(t-1)^{th}$ image, and a position of a $(t-1)^{th}$ limb joint.

Moreover, the at least one limb ridge point may be collected after ridge points of other ridge regions are removed using a data slicing technique.

In other example embodiments, an apparatus for tracking a joint motion of an object includes: an initial information acquisition unit configured to acquire initial information of the object including information on at least one ridge region representing a distribution of ridge points of the object; and a joint motion tracking unit configured to track the joint motion of the object from temporally consecutive images of the object based on the initial information.

Here, the initial information acquisition unit may include: a point selector configured to select a point in a contour of the object from an image of the object in a predetermined posture; a slope calculator configured to calculate a chamfer distance of the point in the contour; a ridge point determiner configured to select at least one object ridge point satisfying a predetermined ridge condition of a chamfer distance and a distribution correction factor representing a distribution of chamfer distances among points in the contour; and a ridge region extractor configured to determine a group consisting of the at least one object ridge point as the at least one ridge region.

Also, a point in the contour satisfying an expression below may be selected under the predetermined ridge condition:

$$\frac{\sum_{i=1}^{N} Cham(X_i)}{N} < Cham(X_c) \cdot \delta_R,$$ [Expression]

where $X_c$ is coordinates of the point in the contour, N is a number of points in the contour having a distance of $Cham(X_c)$ from $X_c$, $Cham(X_i)$ is a chamfer distance of a point in the contour indicated by a variable i among the N points in the contour, and $\delta_R$ is a distribution correction factor representing a distribution of chamfer distances.

Further, the joint motion tracking unit may include: a head tracker configured to determine a head center position in a $t^{th}$ image among the temporally consecutive images based on coordinates of at least one head ridge point satisfying a predetermined head condition among the object ridge points; a torso tracker configured to determine torso joint positions in the $t^{th}$ image based on coordinates of at least one torso ridge point satisfying a predetermined torso condition among the object ridge points other than the at least one head ridge point; and a limb tracker configured to determine limb joint positions in the $t^{th}$ image based on coordinates of at least one limb ridge point satisfying a predetermined limb condition among the object ridge points other than the at least one head ridge point and the at least one torso ridge point.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS
OF THE PRESENT INVENTION

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

First, terms used herein will be described below.

A chamfer distance is a distance to the closest point in a contour. "Chamfer" is a term mainly used in architecture, denoting a portion of a member of a framework having an angular cross section formed by cutting off a corner. Chamfers are mainly planar but have many types, such as a round facet. In other words, the term "chamfer distance" used herein denotes the length of a normal line from an arbitrary point in a member of framework to the contour of a chamfer.

A ridge is also known as the word "chine." Therefore, a ridge point may denote a point on a main ridge between mountain peaks. In other words, a ridge point may not denote a point of a portion recessed from its surroundings like a valley but may denote a point of a portion projecting from its surroundings. However, the term "ridge point" used herein does not denote a point of a portion projecting from its surroundings but denotes a point that is in the contour of an object and has a longer normal line to the contour than other adjacent points by a predetermined value or more. In other words, ridge points denote points that are in the contour of an object and have long distances to the contour, and thus are gathered at the center of the inside of the contour.

A Euclidean distance is frequently used to calculate the distance between two points. Using the distance, a Euclidean space can be defined. For example, a Euclidean distance d between a point $P=(p1, p2, \ldots, pn)$ and a point $Q=(q1, q2, \ldots, qn)$ expressed in an N-dimensional rectangular coordinate system is defined by Expression 1 as follows.

$$d=\sqrt{(p1-q1)^2+(p2-q2)^2+\ldots+(pn-qn)^2}. \quad \text{[Expression 1]}$$

Therefore, a Euclidean distance is the shortest distance between two points in a rectangular coordinate system.

On the other hand, a geodesic is a generalization of the notion of a straight line to curved spaces. The term "geodesic" comes from geodesy, the science of measuring the shortest route between two points on the Earth's surface (a part of the great circle) and so on. The term "geodesic distance" used herein denotes the distance of a geodesic that is the shortest curve between two points on a three-dimensional (3D) surface of an object.

Hereinafter, example embodiments of the present invention will be described in detail with reference to the accompanying drawings.

Figure 1:
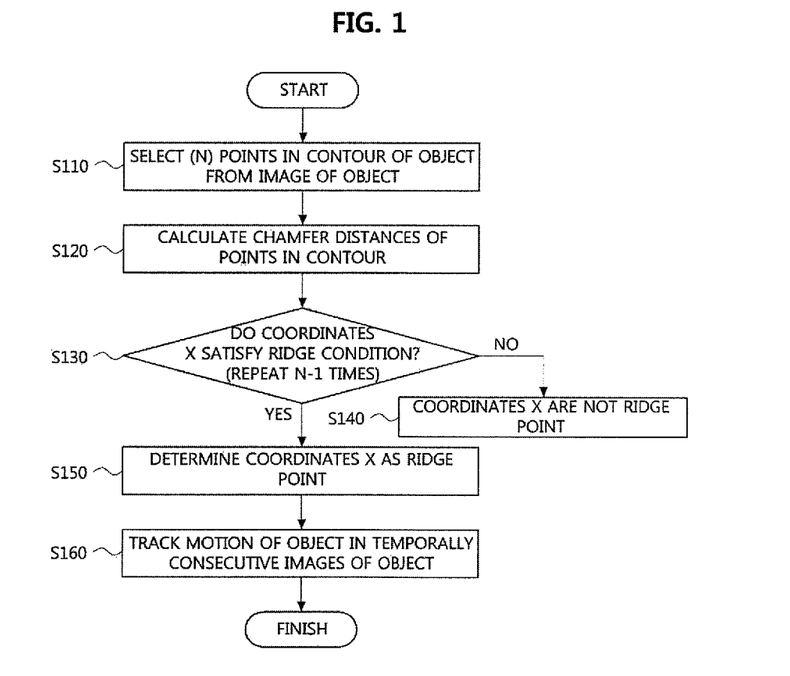
FIG. 1 is a flowchart illustrating a method of extracting ridge data according to an example embodiment of the present invention.

FIG. 1 is a flowchart illustrating a method of extracting ridge data according to an example embodiment of the present invention. The method of extracting ridge data will be described below with reference to FIG. 1.

In a method of tracking motion of an object, a method of extracting ridge data may include an operation of selecting points in the contour of the object from an image of the object (S110), an operation of calculating the chamfer distances of the points in the contour (S120), and an operation of determining whether at least one point in the contour is a ridge point based on the relationships between the chamfer distances and chamfer distances of points in the contour adjacent to the points in the contour (S130 and S150). If coordinates X do not satisfy ridge condition in S130, the coordinates X are not the ride point (S140).

In general, the object may have a volume and movement. For example, the object may be a mechanical structure, such as an airplane, an animal, a human, or so on. In general, the image may be an image taken by a camera, and also be a moving picture created using computer graphics technology.

The points in the contour denote points in the silhouette of the object whose position will be analyzed. When an algorithm proposed in the present invention is used to determine a ridge point, it is possible to collect many pieces of candidate data appropriate for body parts of the corresponding object. For example, when the object is a human, ridge data may be mainly positioned on the skeleton.

The method of extracting ridge data may further include an operation of tracking motion of the object based on the coordinates of a ridge point in one of temporally consecutive images of the object and the chamfer distance of the ridge point (S160).

By analyzing the temporally consecutive images of the object, it is possible to extract ridge data with which the position of a specific part of the object may be determined. The positions, distances, angles, etc. of major parts of the object are calculated by analyzing an initial image of the object, and the position of a specific part may be determined in a current image using coordinates determined as positions of the specific part in a previous image and an image preceding the previous image among temporally consecutive images after the initial image and the Rodriguez rotation matrix that will be described later.

Figure 2:
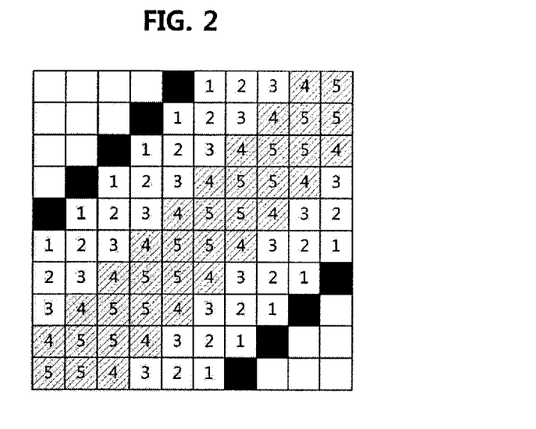
FIG. 2 is an example diagram illustrating a method of calculating the chamfer distance of a point in the contour of an object and determining ridge data based on the chamfer distance according to an example embodiment of the present invention.

FIG. 2 is an example diagram illustrating a method of calculating the chamfer distance of a point in the contour of an object and determining ridge data based on the chamfer distance according to an example embodiment of the present invention. Determinations of a chamfer distance and ridge data will be described below with reference to FIG. 2.

According to the relationships between the chamfer distance of a point in a contour and the chamfer distances of points in the contour adjacent to the point in the contour, a point $X_c$ in the contour satisfying an expression below may be selected.

$$\frac{\sum_{i=1}^{N} Cham(X_i)}{N} < Cham(X_c) \cdot \delta_R, \quad \text{[Expression 2]}$$

Here, $X_c$ is the coordinates of the point in the contour, N is a number of points in the contour having a distance of $Cham(X_c)$ from $X_c$, $Cham(X_i)$ is the chamfer distance of a point in the contour indicated by a variable i among the N points in the contour, and $\delta_R$ is a distribution correction factor representing a distribution of chamfer distances.

In the algorithm proposed as an example embodiment of the present invention to determine a ridge point, it is important to collect much ridge data appropriate for body parts of the corresponding object. Here, $Cham(X_c)$ is the distance from $X_c$ to the closest point in the contour of the object in terms of chamfer distance in a distance map acquired through a chamfer distance transform, and $X_i$ is one of N different coordinates that are apart from $X_c$ by $Cham(X_i)$. The thickness of collected ridge data may be adjusted with a distribution correction factor of less than one. In other words, the closer to zero the distribution correction factor is, the thinner the region of the ridge data becomes, and the closer to one the distribution correction factor is, the thicker the region of the ridge data becomes.

Referring to Expression 2, the distribution correction factor may be used to correct the chamfer distance of a point in the contour. In other words, the left-hand side of Expression 2 denotes the average of the chamfer distances of N different coordinates that are apart from $X_c$ by $Cham(X_c)$, and the chamfer distance of $X_c$ on the right-hand side is necessary to be greater than the average. Therefore, when the distribution correction factor is close to zero, $X_c$ satisfying the condition may be rarely found.

Therefore, the distribution correction factor representing the distribution of ridge points may be set to vary according to a part of the object from which ridge data will be acquired. When the object is a human, the distribution correction factor may also be set to vary according to his or her clothes.

FIG. 2 shows a distance map made using a black contour, and collected ridge points (shaded points). The number written in each pair of image coordinates denotes the chamfer distance at the coordinates of the corresponding point. A condition for determining a ridge point is not limited to Expression 2, and other example embodiments are available for determining a valid and proper ridge point.

Figure 3:
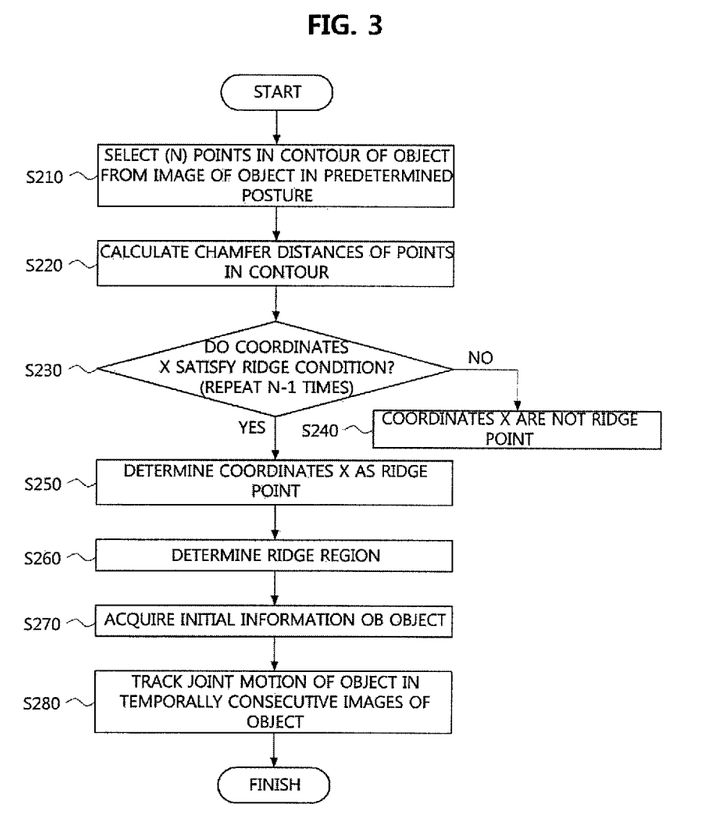
FIG. 3 is a flowchart illustrating a method of tracking a joint motion of an object according to an example embodiment of the present invention.

FIG. 3 is a flowchart illustrating a method of tracking a joint motion of an object according to an example embodiment of the present invention. The method of tracking a joint motion of an object will be described below with reference to FIG. 3.

The method of tracking a joint motion of an object may include an operation of acquiring initial information of the object including information on at least one ridge region representing the distribution of ridge points of the object (S270), and an operation of tracking the joint motion of the object from temporally consecutive images of the object based on the initial information (S280).

The method of tracking a joint motion of an object may be efficient at tracking motion of objects having a skeletal structure in general. According to the method proposed in an example embodiment of the present invention, only coordinates in the contour of an object are used, and thus it is possible to acquire ridge points regardless of the actual position of the object's skeleton. In other words, since ridge data acquired by performing an arithmetic operation on points in the contour has an overall shape similar to the skeletal structure of the object, it is possible to approximately estimate the actual position of a joint by analyzing pieces of ridge data satisfying a predetermined condition.

This method may be mainly used to track motion of objects that have many parts of fixed lengths. For example, in the case of a human, the head size, the distance between both shoulders, the distance between a knee and a foot, etc. are scarcely changed even during a movement. Specifically, the ridge data of a foot region is highly likely to be found at a distance of a lower leg from the position of a knee.

In other words, this method may be used to track objects maintaining a fixed shape, such as an animal having an exoskeleton or an endoskeleton, a robot, and an airplane, rather than a cephalopod, such as an octopus, or a material in the sol state.

Since the method of extracting a ridge point has been described above, the description will not be reiterated. That is, the operations of S110, S120, S130, S140 and S150 of FIG. 1 are the same as operations of S210, S220, S230, S240 and S250 of FIG. 3. When ridge data of an object is determined (S250), it is possible to determine a ridge region that is a region of ridge points (S260). The ridge region may be determined according to a joint or a part to be tracked. For example, in the case of a human body, ridge regions may be determined as a left upper arm region, a right lower leg region, a left shoulder region, a head center region, etc. as occasion demands.

In the operation of tracking a joint motion of the object (S280), it is possible to analyze temporally consecutive images of the object and extract ridge data with which the position of a specific part of the object may be determined. After an initial image of the object is analyzed to calculate the positions, distances, angles, etc. of major parts of the object in the operation of acquiring initial information (S270) that is the previous operation, the position of a specific part may be determined in a current image in this operation using coordinates determined as positions of the specific part in a previous image and an image preceding the previous image among temporally consecutive images after the initial image and the Rodriguez rotation matrix that will be described later.

Figure 4:
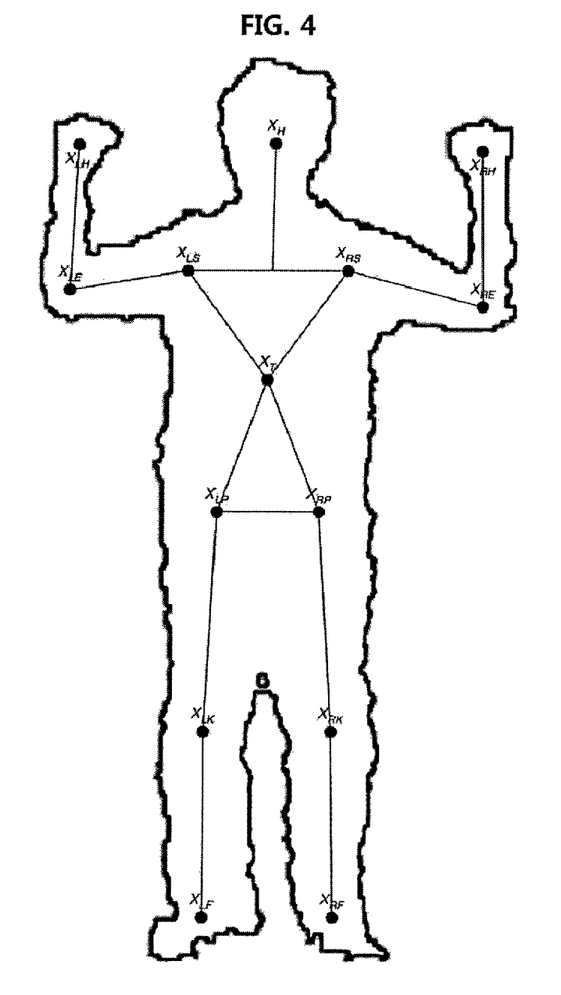
FIG. 4 is an example diagram of a human body illustrating a predetermined posture for acquiring initial information of an object according to an example embodiment of the present invention.
Figure 5:
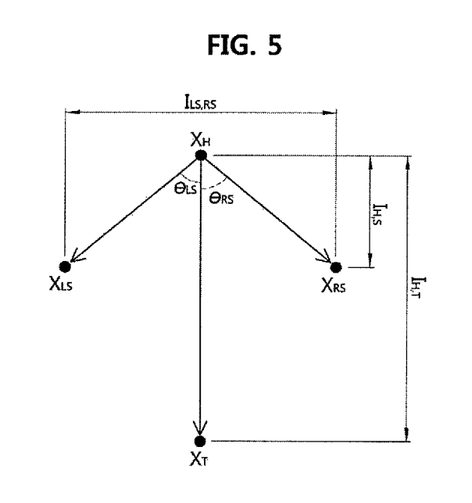
FIG. 5 is a conceptual diagram illustrating head-shoulder-torso (HST) structure information that is initial information of an object for tracking a torso center position according to an example embodiment of the present invention.
Figure 6:
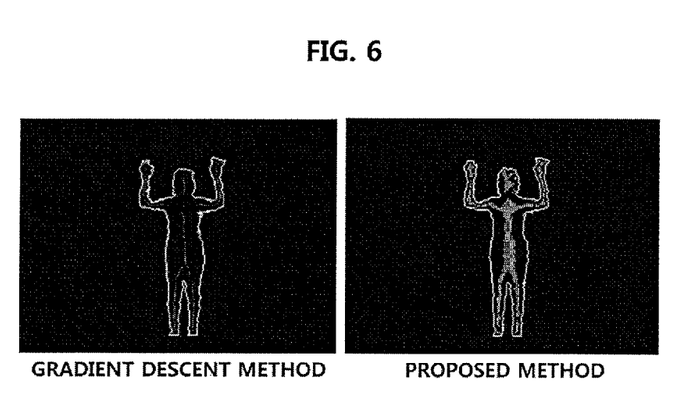
FIG. 6 is an example diagram illustrating ridge data determined using a proposed algorithm according to an example embodiment of the present invention.

FIG. 4 is an example diagram of a human body illustrating a predetermined posture for acquiring initial information of an object according to an example embodiment of the present invention, FIG. 5 is a conceptual diagram illustrating head-shoulder-torso (HST) structure information that is initial information of an object for tracking a torso center position, and FIG. 6 is an example diagram illustrating ridge data determined using a proposed algorithm. The operation of acquiring initial information will be described below with reference to FIGS. 4 to 6.

The operation of acquiring initial information may include an operation of selecting a point in the contour of an object from an image of the object in a predetermined posture, an operation of calculating a chamfer distance of the point in the contour, an operation of selecting at least one object ridge point satisfying a predetermined ridge condition of the chamfer distance and a distribution correction factor representing a distribution of chamfer distances among points in the contour, and an operation of determining a group consisting of the at least one object ridge point as at least one ridge region.

Under the predetermined ridge condition, a point in the contour satisfying Expression 2 described above may be selected.

The predetermined posture may be a posture in which it is easy to measure the lengths, angles, etc. of major parts of the object. For example, in the case of a human, it is preferable for the person to raise the upper arms and the fore arms with an angle of 90 degrees such that the ridge regions of the upper arms and the fore arms are clearly shown, and to stand facing a camera without covering respective parts. From now, the initial information acquisition process will be described on the assumption of the posture of FIG. 4.

Example embodiments of the present invention are described with a kinematic model of a human defined to have 14 body parts, a head H, a left shoulder LS, a right shoulder RS, a left elbow LE, a right elbow RE, a left hand LH, a right hand RH, a torso center T, a left pelvis LP, a right pelvis RP, a left knee LK, a right knee RK, a left foot LF, and a right foot RF. Body parts may also be defined in other ways, and parts other than those mentioned above as examples may also be used for definition. Therefore, the present invention is not limited to the kinematic model. It is necessary to define the unique kinematic model of each person so as to track body parts of persons having various body types using the corresponding models, and this is referred to as an initial information acquisition operation.

The initial information acquisition operation according to an example embodiment of the present invention may include 1) an initial torso information acquisition operation, 2) an initial head information acquisition operation, and 3) an initial limb information acquisition operation.

Initial torso information may be expressed as $\{x_{min}^T, x_{max}^T, y_{min}^T, y_{max}^T, z_{min}^T, z_{max}^T\}$. $\{x_{min}^T, x_{max}^T\}$ are the leftmost and rightmost X coordinates of a user's torso, respectively. By searching an input image of the user in the Y direction, a minimum $x_{min}^T$ and a maximum $x_{max}^T$ are determined among X coordinates whose consecutive data has a greater length than half the largest height of the user, and a width $T_w = x_{max}^T - x_{min}^T$ of the torso is calculated. Also, $\{y_{min}^T, y_{max}^T\}$ are the lowermost and uppermost Y coordinates of the torso. By searching the input image in the X direction, a minimum $y_{min}^T$ is determined among Y coordinates whose consecutive data has a greater length than half the largest width of the user, and $y_{max}^T = y_{min}^T + 1.5 \cdot T_w$ and a height $T_h = 1.5 \cdot T_w$ of the torso are calculated. Finally, $\{z_{min}^T, z_{max}^T\}$ are determined as a minimum $z_{min}^T$ and a maximum $z_{max}^T$ among Z coordinates found in a quadrangle determined by $\{x_{min}^T, x_{max}^T, y_{min}^T, y_{max}^T\}$, and a thickness $T_d = z_{max}^T - z_{min}^T$ of the torso is calculated.

After the width, height, and thickness information of the torso is acquired, the initial positions of a torso center, both shoulders, and both hip joints using the average of points in the contour satisfying conditions given below. Therefore, in this example embodiment, sets of the following points may be ridge regions representing a torso center region, both shoulder regions, and both hip joint regions.

$$X_0^T = \{X | X=(x,y,z) \text{ and } x_{min}^T < x < x_{max}^T \text{ and } y_{min}^T < y < y_{max}^T\},$$

$$X_0^{LS} = \{X | X=(x,y,z) \text{ and } x_{min}^T < x < x_{min}^T + 0.1 \cdot T_w \text{ and } y_{max}^T - 0.1 \cdot T_h < y < y_{max}^T\},$$

$$X_0^{RS} = \{X | X=(x,y,z) \text{ and } x_{max}^T - 0.2 \cdot T_w < x < x_{max}^T \text{ and } y_{max}^T - 0.1 \cdot T_h < y < y_{max}^T\},$$

$$X_0^{LR} = \{X | X=(x,y,z) \text{ and } x_{min}^T < x < x_{min}^T + 0.5 \cdot T_w \text{ and } y_{min}^T < y < y_{min}^T + 0.1 \cdot T_h\},$$

$$X_0^{RP} = \{X | X=(x,y,z) \text{ and } x_{max}^T - 0.5 \cdot T_w < x < x_{max}^T \text{ and } y_{min}^T < y < y_{min}^T + 0.1 \cdot T_h\} \quad \text{[Expression 3]}$$

A head center position acquired through the initial head information acquisition operation is a radius $r_H$ of the head. The head center position is present between $x_{min}^T$ and $x_{max}^T$ and half the length between $y_{max}^H$ and $y_{max}^T$ that are uppermost coordinates among points in the contour. The head center position is determined using the average of points in the contour satisfying the following condition.

$$X_0^H = \{X | X=(x,y,z) \text{ and } x_{min}^T < x < x_{max}^T \text{ and } y_{max}^T < y\}. \quad \text{[Expression 4]}$$

When the initial torso information acquisition operation and the initial head information to acquisition operation are completed in the operation of acquiring initial information, it is possible to acquire HST structure information to be used in the operation of tracking joint motion that will be described later. A self-occlusion may frequently occur at the positions of the shoulders, the torso center, and the hip joints belonging to the torso due to movement of the user. To stably track a joint belonging to the torso in the operation of tracking a joint motion even in this situation, an HST structure may be used in an example embodiment of the present invention. Referring to FIG. 5, the HST structure may be defined with five pieces of body information $\{l_{H,S}, l_{LS,RS}, l_{H,T}, \theta_{LS}, \theta_{RS}\}$ after the positions of the head and the shoulders are determined in the operation of acquiring initial information.

In the operation of acquiring initial information, two linear regression equations representing an upper arm and a fore arm may be found by performing linear regression on object ridge points in an upper arm region and a fore arm region among the at least one ridge region, and a cross point of the two linear regression equations may be determined as an elbow position.

Body information of an arm acquired through the initial arm information acquisition operation may be represented as $\{l_{UA}, l_{FA}\}$, which may be defined as the lengths of an upper arm and a fore arm, respectively. As the position of an elbow necessary to calculate the lengths of the upper arm and the fore arm, a cross point of two straight lines formed from ridge data may be found and determined. A region in which it is possible to find a hand in the initial posture is regions on the left and right sides of the torso, and the position of a hand may be determined through ridge data found at the uppermost portion of each of the regions. Also, using ridge data found within a predetermined range from the determined position of a hand, the direction of the fore arm may be calculated. Data of a region closest to the torso among regions used to detect the hand is used as reference coordinates for calculating the direction of the upper arm, and the direction of the upper arm may be calculated using data found within a predetermined range like in the case of determining the direction of the fore arm. The directions of the upper arm and the fore arm are calculated in a two-dimensional (2D) space, and a cross point of two direction vectors may be determined as the position of an elbow.

In addition, in the operation of acquiring initial information, two linear regression equations representing a thigh and a lower leg may be found by performing linear regression on object ridge points in a thigh region and a lower leg region among ridge regions, a cross point of the two linear regression equations may be determined as a knee position when an acute angle between crossing angles formed by the two linear regression equations is larger than a predetermined angle, and a middle point between coordinates of a hip joint and floor plane coordinates closest to the hip joint coordinates may be determined as the knee position when the acute angle is equal to or smaller than the predetermined angle.

In the initial leg information acquisition operation, it is possible to acquire body information of a leg represented as $\{l_{TH}, l_{LL}\}$, which may be defined as the lengths of a thigh and a lower leg, respectively. The lengths of the thigh and the lower leg may be calculated in the same way as in the initial arm information acquisition operation. However, since the position of the knee may not be accurately determined like in FIG. 4, it is possible to calculate the entire length of the leg using the distance between the hip joint and the floor plane.

$$l_{leg} = \frac{1}{2} \cdot \overline{F} \cdot (X_{LP} + X_{RP}) + d_F. \quad \text{[Expression 5]}$$

Here, $\overline{F}$ is a unit vector representing a vertical component with respect to the floor plane, and $d_F$ is the shortest distance between the floor plane and a camera origin. The lengths of the thigh and the lower leg may be considered to be half the entire length of the leg.

Figure 7:
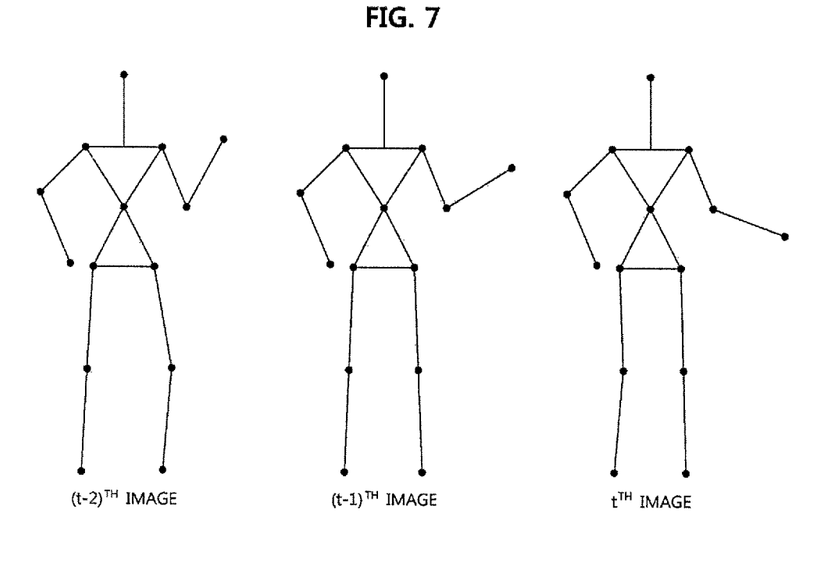
FIG. 7 is a conceptual diagram illustrating a method of tracking a joint motion of an object from temporally consecutive images according to example embodiments of the present invention.

FIG. 7 is a conceptual diagram illustrating a method of tracking a joint motion of an object from temporally consecutive images according to example embodiments of the present invention. The method of tracking a joint motion will be described below with reference to FIG. 7.

The operation of tracking a joint motion may include a head tracking operation of determining the position of a head center in a $t^{th}$ image among temporally consecutive images based on coordinates of at least one head ridge point satisfying a predetermined head condition among object ridge points, a torso tracking operation of determining torso joint positions in the $t^{th}$ image based on coordinates of at least one torso ridge point satisfying a predetermined torso condition among the object ridge points other than the head ridge point, and a limb tracking operation of determining the limb joint positions in the $t^{th}$ image based on coordinates of at least one limb ridge point satisfying a predetermined limb condition among the object ridge points other than the head ridge point and the torso ridge point.

Based on the kinematic model defined as an example embodiment of the present invention, body parts may be tracked in order of a head, a torso, arms, and legs. When tracking of each individual body part succeeds, it is possible to use a method of reducing search regions for collecting valid ridge data by performing labeling on relevant data using the corresponding position and the initial information of the corresponding body part.

The predetermined head condition may be expressed as at least one equation or inequality relating a displacement of the head center in a $(t-1)^{th}$ image among the temporally consecutive images and a head ridge region in the $t^{th}$ image.

In the head tracking operation, a head position may be found in a current image using relative distance information between the center of entire data and a head position up to a previous image and head size information acquired in the operation of acquiring initial information. The head position is the base position of the kinematic model proposed as an example embodiment of the present invention, and thus may be defined in a 3D Euclidean space while a motion model is independently maintained.

$$\overline{X_H^t} = X_H^{t-1} + \Delta X_H^{t-1}.$$ [Expression 6]

Here, $\overline{X_H^t}$ is an estimated position of the head center in the $t^{th}$ image, and $X_H^{t-1}$ is the position of the head center in the $(t-1)^{th}$ image. $\Delta X_H^{t-1}$ is a displacement of the head center in the $t^{th}$ image. $\Delta X_H^{t-1}$ may be determined to be zero in the case of t=0, and to be $X_H^{t-1} - X_H^{t-2}$ in the case of t being equal to or larger than one. The head position in the given $t^{th}$ image may be calculated as follows.

$$H^T = \qquad\qquad\qquad\qquad\qquad\qquad\text{[Expression 7]}$$
$$\{X | X \in R^t \text{ and } |X - \overline{X_H^t}| < r_H \text{ and } \big| \|X - \overline{X_T^t}\| - l_{H,T}^{t-1} \big| < r_H \},$$
$$X_H^t = \frac{1}{|H^T|} \sum_{X_j \in H^T} X_j.$$

$R^t$ denotes a set of ridge points detected in the $t^{th}$ image, and it is possible to collect ridge points in a valid head ridge region using a head ridge point among the ridge points, a relative distance condition $l_{H,T}^{t-1}$ between the center of the data and a head position in the previous image, and a head radius condition $r_H$ acquired in the operation of acquiring initial information. The actual position of the head in the $t^{th}$ image that is the current image may be determined by averaging data collected in this way.

A torso center position among torso joint positions may be determined based on HST structure information in the initial information, and the HST structure information may be expressed as distances and angles between the head center, both shoulders, and the torso center.

In the torso tracking operation, the positions of the shoulders, the torso center, and hip joints that are joints belonging to the torso may be determined. When at least one shoulder is found in an image, the direction and the position of the torso may be determined. Therefore, it is most important to find a valid shoulder position. The process of finding a valid shoulder position may be started by collecting candidate ridge points for a shoulder ridge region first. A search region of a shoulder may be determined based on a shoulder position estimated using the kinematic model. The estimated shoulder position may be calculated as follows.

$$\overline{X_i^t} = R_i^{t-1}(X_i^{t-1} - X_H^{t-1}) + X_H^t, (i \in \{LS, RS, T\}).$$ [Expression 8]

Here, $X_H^{t-1}$ is the position of a head center in the $(t-1)^{th}$ image, and $R_i^{t-1}$ is a 3-by-3 rotation matrix for rotating an i joint in a $(t-2)^{th}$ image to the $(t-1)^{th}$ image. When t=0, $R_i^{t-1}$ is defined as a unit matrix. Pieces of distance data acquired from a region in which a shoulder is likely to be found based on the estimated shoulder position are collected as candidate data. Among the pieces of distance data, only valid pieces of data satisfying body conditions acquired in the operation of acquiring initial information are collected and determined as ridge points in a shoulder ridge region.

A shoulder position is calculated as the average of data included in a set of the ridge points in the shoulder ridge region collected for the left and right shoulders. The validity of the calculated shoulder position may be determined using a ratio between the collected candidate data and the ridge points in the shoulder ridge region.

The torso center position that is frequently covered and difficult to accurately find may be found using the HST structure acquired in the previous operation of acquiring initial information and the ridge points in the shoulder ridge region.

$$X_T^t = \frac{1}{|S^t|} l_{H,T} \cdot R_{ST} \cdot \frac{X_S^t - X_H^t}{|X_S^t - X_H^t|}, (S \in S^t = \{X_{LS}^t, X_{RS}^t\}).$$ [Expression 9]

Here, $S^t$ is a set of shoulder ridge points in a valid shoulder ridge region found in the $t^{th}$ image, $l_{H,T}$ is a relative distance between the head and the torso center defined in the HST structure, and $R_{ST}$ is a 3-by-3 Rodriguez rotation matrix determined through the HST structure and may be defined with the axis of rotation and the angle of rotation. Here, $l_{H,T}$ is the distance between the head and the torso acquired in the operation of acquiring initial information, $X_S^t$ is the position of a left or right shoulder in the $t^{th}$ image, and $R_{ST}$ is a 3-by-3 Rodriguez rotation matrix using the angle between the shoulder and the torso center and the unit normal vector of the two vectors thereof.

Using the shoulder joint position in the ell image and the torso center position in the $(t-1)^{th}$ image acquired in this way, a torso rotation matrix for rotating a joint belonging to the torso may be calculated. Using the acquired torso rotation matrix, it is possible to determine the position of a hip joint and the position of a shoulder that is covered and thus its valid shoulder ridge region has not been detected.

Among the positions of limb joints, the positions of both elbows and both knees may be determined based on the positions of both shoulders and both hip joints that are the upper joints of the elbows and the knees respectively, and the positions of both hands and both feet may be determined based on the positions of both the elbows and both the knees that are the upper joints of the hands and feet respectively.

In addition, the predetermined limb condition may be expressed as at least one equation or inequality relating the Euclidean distance and the geodesic distance between a limb ridge point in the region of a lower joint and an upper joint directly above the lower joint.

The positions of an elbow, a hand, a knee, and a foot belonging to limbs are defined using forward kinematics, and are subordinate to the positions of upper joints thereof. The i joint that is a lower joint may be defined as follows.

$$X_i^t = X_{i-1}^t + (R_{i-1}^t \ldots R_0^t)(X_i^{t-1} - X_{i-1}^{t-1}). \quad \text{[Expression 10]}$$

The position of each individual lower joint may be determined using only ridge points and a distance condition, or using a method for a case in which the number of valid ridge points collected using only ridge points and a distance condition is smaller than a predetermined number.

According to the method of determining the position of a lower joint using only ridge points and a distance condition, ridge data satisfying a length condition of body parts acquired in the operation of acquiring initial information may be collected based on the position of the upper joint and form a candidate data set. Depending to the lower joint to be detected, the length condition used at this time may be a length condition between the lower joint and a lower joint of the lower joint as well as a length condition between the lower joint and the upper joint or may be only the length condition between the lower joint and the upper joint. For example, both a length condition between an elbow and a shoulder and a length condition between the elbow and a hand are used to detect the elbow, whereas only a length condition between a hand and an elbow may be used to detect the hand. To use a length condition between a joint and a lower joint, the position of the lower joint may be estimated using a joint motion model in a previous image and used.

To leave only ridge points related to the corresponding joint in the collected candidate data, the probability of a straight surface line between two pieces of 3D data may be used. The probability of a straight surface line may be calculated as a ratio between the Euclidean distance and the geodesic distance between two points. The higher the probability of a straight surface line, the higher the probability that the two point will belong to one body part. For example, two points belonging to different body parts have a large difference between the Euclidean distance and the geodesic distance, whereas two points belonging to the same body part have the Euclidean distance and the geodesic distance similar to each other. A set $V_i^t$ of ridge points of the i joint that is a lower joint may be expressed as follows.

$$V_i^t = \left\{ X \mid \frac{D_{E(X_{i-1}^t, X)}}{D_{G(X_{i-1}^t, X)}} > \delta_{surf} \right\}. \quad \text{[Expression 11]}$$

Here, $D_{E(X_{i-1}^t, X)}$ is the Euclidean distance between a point in the contour and an upper joint position, $D_{G(X_{i-1}^t, X)}$ is the geodesic distance, and $X_{i-1}^t$ is the coordinates of an (i−1) joint, which is the upper joint of the i joint, determined in the $t^{th}$ image.

When the number of limb ridge points satisfying the predetermined limb condition is equal to or smaller than the predetermined number, the position of a limb joint may be calculated based on the initial information, an upper joint position in the $(t-1)^{th}$ image, and the position of a $(t-1)^{th}$ limb joint.

In other words, when not enough ridge points satisfying a length condition are collected, a lower joint tracking operation may be performed by collecting 3D input data around a position estimated using a motion model of the joint.

$$\overline{X_i^t} = X_{i-1}^t + (w_{i-1} \cdot R_{i-1}^{t-1} \ldots R_0^{t-1})(X_i^{t-1} - X_{i-1}^{t-1}). \quad \text{[Expression 12]}$$

Limb ridge points may be collected after ridge points of other ridge regions are removed using a data slicing technique.

In the operation of tracking a joint motion, data satisfying a distance condition between joints and the probability of a straight surface line may be collected from ridge points. However, the data collected at this time may include data belonging to other body parts. For example, when a hand is in front of the abdomen, collected data also includes data belonging to the torso. In this case, based on the fact that data belonging to an arm or a leg is in front of surrounding data at all times, valid data may be collected using the data slicing technique.

Figure 8:
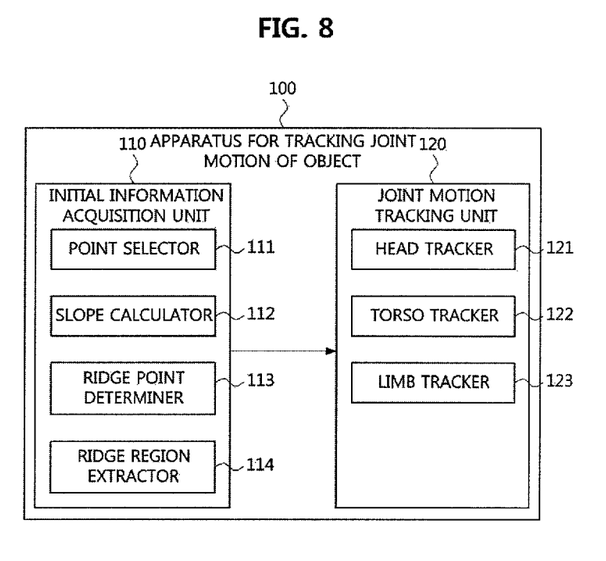
FIG. 8 is a block diagram of an apparatus for tracking a joint motion of an object according to an example embodiment of the present invention.

FIG. 8 is a block diagram of an apparatus for tracking a joint motion of an object according to an example embodiment of the present invention. The apparatus for tracking a joint motion of an object and components of the apparatus will be described below with reference to FIG. 8.

An apparatus 100 for tracking a joint motion of an object may include an initial information acquisition unit 110 that acquires initial information of the object including information on at least one ridge region representing the distribution of ridge points of the object, and a joint motion tracking unit 120 that tracks the joint motion of the object from temporally consecutive images of the object based on the initial information.

The process for the initial information acquisition unit 110 and the joint motion tracking unit 120 to extract the ridge points has been described above, and the description will not be reiterated. When the ridge data of the object is determined, it is possible to determine ridge regions that are regions of the ridge points. A ridge region may be determined according to a desired joint or part.

The joint motion tracking unit 120 may extract ridge data with which the position of a specific part of the object by analyzing temporally consecutive images of the object. After the initial information acquisition unit 110 calculates the positions, distances, angles, etc. of major parts of the object by analyzing an initial image of the object, the joint motion tracking unit 120 may determine the position of the specific part in a current image using coordinates determined as positions of the specific part in a previous image and an image preceding the previous image among temporally consecutive images behind the initial image and the Rodriguez rotation matrix.

The initial information acquisition unit 110 may include a point selector 111 that selects a point in the contour of the object from an image of the object in a predetermined posture, a slope calculator 112 that calculates the chamfer distance of the point in the contour, a ridge point determiner 113 that selects at least one object ridge point satisfying a predetermined ridge condition of a chamfer distance and a distribution correction factor representing the distribution of chamfer distances among points in the contour, and a ridge region extractor 114 that determines a group consisting of the at least one object ridge point as at least one ridge region.

Under the predetermined ridge condition, a point in the contour satisfying Expression 2 may be selected.

The predetermined posture may be a posture in which it is easy to measure the lengths, angles, etc. of major parts of the object. For example, in the case of a human, it is preferable for the person to raise the upper arms and the fore arms with an angle of 90 degrees such that the ridge regions of the upper arms and the fore arms are clearly shown, and to stand facing a camera without covering respective parts. From now, an initial information acquisition process will be described on the assumption of the posture of FIG. 4.

The kinematic model of a human shown in FIG. 4 has been described above, and the description will not be reiterated. To acquire 1) initial torso information, 2) initial head information, and 3) initial limb information in stages, in the initial information acquisition unit 110 according to an example embodiment of the present invention, when the slope calculator 112 calculates the chamfer distances of points in the contour selected by the point selector 111, the ridge point determiner 113 selects object ridge points satisfying a predetermined condition, such as Expression 2, and the ridge region extractor 114 determines ridge regions matched with the object ridge points.

The joint motion tracking unit 120 may include a head tracker 121 that determines a head center position in a $t^{th}$ image among the temporally consecutive images based on coordinates of at least one head ridge point satisfying a predetermined head condition among the object ridge points, a torso tracker 122 that determines torso joint positions in the $t^{th}$ image based on coordinates of at least one torso ridge point satisfying a predetermined torso condition among the object ridge points other than the head ridge point, and a limb tracker 123 that determines limb joint positions in the $t^{th}$ image based on coordinates of at least one limb ridge point satisfying a predetermined limb condition among the object ridge points other than the head ridge point and the torso ridge point.

Based on the kinematic model defined as an example embodiment of the present invention, body parts may be tracked in order of a head, a torso, arms, and legs. When tracking of each individual body part succeeds, it is possible to use a method of reducing search regions for collecting valid ridge data by performing labeling on relevant data using the corresponding position and the initial information of the corresponding body part.

The head tracker 121 may determine a head position satisfying the predetermined head condition described above using all the ridge points of the object as search regions. The torso tracker 122 may determine torso joint positions satisfying the predetermined torso condition described above among the ridge points other than the head ridge point. The limb tracker 123 may determine a limb position satisfying the predetermined limb condition described above among the remaining ridge points. The processes of tracking respective body parts have been described above, and the description will not be reiterated.

The example embodiments of the present invention relate to an apparatus and method for tracking a joint motion which make it possible to recognize the position of a joint of a human in real time, and have an advantage in that easy recognition is enabled even when the joint is covered due to various motions of the object. The apparatus and method use no additional equipment other than a 3D camera and thus can be readily used in various fields. Through a simple initialization process alone, it is possible to recognize joints of humans having various body types, and an existing learning process that consumes much time can be omitted.

While the example embodiments of the present invention and their advantages have been described in detail, it should be understood that various changes, substitutions and alterations may be made herein without departing from the scope of the invention.

What is claimed is:

1. A method of extracting ridge data in a method of tracking motion of an object, the method comprising:
   selecting a point in a contour of the object from an image of the object;
   calculating a chamfer distance of the point in the contour;
   determining whether the point in the contour is a ridge point based on relationships between the chamfer distance and chamfer distances of points in the contour adjacent to the point in the contour; and
   tracking a position of a specific part of the object based on coordinates of a ridge point in one image among temporally consecutive images of the object and a chamfer distance of the ridge point,
   wherein a distribution correction factor representing a distribution of chamfer distances is set to vary according a part of the object from which ridge data is acquired.

2. The method of claim 1, wherein a point in the contour satisfying an expression below is selected according to the relationships between the chamfer distance and the chamfer distances of the points in the contour adjacent to the point in the contour:

$$\frac{\sum_{i=1}^{N} Cham(X_i)}{N} < Cham(X_c) \cdot \delta_R, \quad \text{[Expression]}$$

where $X_c$ is coordinates of the point in the contour, N is a number of points in the contour having a distance of $Cham(X_c)$ from $X_c$, $Cham(X_i)$ is a chamfer distance of a point in the contour indicated by a variable i among the N points in the contour, and $\delta_R$ is a distribution correction factor representing a distribution of chamfer distances.

3. A method of tracking a joint motion of an object, the method comprising:
   acquiring initial information of the object including information on at least one ridge region representing a distribution of ridge points of the object; and
   tracking the joint motion of the object based on coordinates of a ridge point in one mage among temporally consecutive images of the object and a chamfer distance of the ridge point, and based on the initial information,
   wherein a distribution correction factor representing a distribution of chamfer distances is set to vary according to a part of the object from which ridge data is acquired.

4. The method of claim 3, wherein the acquiring of the initial information comprises:
   selecting a point in a contour of the object from an image of the object in a predetermined posture;
   calculating a chamfer distance of the point in the contour;
   selecting at least one object ridge point satisfying a predetermined ridge condition of a chamfer distance and a distribution correction factor representing a distribution of chamfer distances among points in the contour; and determining a group consisting of the at least one object ridge point as the at least one ridge region.

5. The method of claim 4, wherein a point in the contour satisfying an expression below is selected under the predetermined ridge condition:

$$\frac{\sum_{i=1}^{N} Cham(X_i)}{N} < Cham(X_c) \cdot \delta_R,$$ [Expression]

where $X_c$ is coordinates of the point in the contour, N is a number of points in the contour having a distance of $Cham(X_c)$ from $X_c$, $Cham(X_i)$ is a chamfer distance of a point in the contour indicated by a variable i among the N points in the contour, and $\delta_R$ is a distribution correction factor representing a distribution of chamfer distances.

6. The method of claim 4, wherein the acquiring of the initial information comprises finding two linear regression equations representing an upper arm and a fore arm by performing linear regression on ridge points in an upper arm region and a fore arm region among the at least one ridge region, and determining a cross point of the two linear regression equations as an elbow position.

7. The method of claim 4, wherein the acquiring of the initial information comprises:
finding two linear regression equations representing a thigh and a lower leg by performing linear regression on ridge points in a thigh region and a lower leg region among the at least one ridge region;
determining a cross point of the two linear regression equations as a knee position when an acute angle between crossing angles formed by the two linear regression equations is larger than a predetermined angle; and
determining a middle point between coordinates of a hip joint and floor plane coordinates closest to the hip joint coordinates as the knee position when the acute angle is equal to or smaller than the predetermined angle.

8. The method of claim 3, wherein the tracking of the joint motion comprises:
a head tracking operation of determining a position of a head center in a $t^{th}$ image among the temporally consecutive images based on coordinates of at least one head ridge point satisfying a predetermined head condition among the object ridge points;
a torso tracking operation of determining torso joint positions in the $t^{th}$ image based on coordinates of at least one torso ridge point satisfying a predetermined torso condition among the object ridge points other than the at least one head ridge point; and
a limb tracking operation of determining limb joint positions in the $t^{th}$ image based on coordinates of at least one limb ridge point satisfying a predetermined limb condition among the object ridge points other than the at least one head ridge point and the at least one torso ridge point.

9. The method of claim 8, wherein the predetermined head condition is expressed as at least one equation or inequality relating a displacement of the head center in a $(t-1)^{th}$ image among the temporally consecutive images and a head ridge region in the $t^{th}$ image.

10. The method of claim 8, wherein the predetermined torso condition is expressed as at least one equation or inequality relating a displacement of a torso center in a $(t-1)^{th}$ image among the temporally consecutive images and the head center position in the $t^{th}$ image.

11. The method of claim 8, wherein a position of a torso center among the torso joint positions is determined based on head-shoulder-torso (HST) structure information in the initial information, and
the HST structure information is expressed as distances and angles between the head center, both shoulders, and the torso center.

12. The method of claim 8, wherein positions of both elbows and positions of both knees among the limb joint positions are determined based on positions of both shoulders and both hip joints, which are upper joints of the elbows and the knees, respectively, and
positions of both hands and positions of both feet among the limb joint positions are determined based on positions of both the elbows and both the knees, which are upper joints of the hands and the feet, respectively.

13. The method of claim 8, wherein the predetermined limb condition is expressed as at least one equation or inequality relating a Euclidean distance and a geodesic distance between the at least one limb ridge point in a region of a lower joint and an upper joint directly above the lower joint.

14. The method of claim 13, wherein the limb tracking operation comprises, when a number of the at least one limb ridge point satisfying the predetermined limb condition is equal to or smaller than a predetermined number, calculating the limb joint positions based on the initial information, a position of the upper joint in a $(t-1)^{th}$ image, and a position of a $(t-1)^{th}$ limb joint.

15. The method of claim 14, wherein the at least one limb ridge point is collected after ridge points of other ridge regions are removed using a data slicing technique.

16. An apparatus for tracking a joint motion of an object, the apparatus comprising:
an initial information acquisition unit configured to acquire initial information of the object including information on at least one ridge region representing a distribution of ridge points of the object; and
a joint motion tracking unit configured to track the joint motion of the object based on coordinates of a ridge point in one image among temporally consecutive images of the object and a chamfer distance of the ridge point, and based on the initial information,
wherein a distribution correction factor representing a distribution of chamfer distances is set.

17. The apparatus of claim 16, wherein the initial information acquisition unit comprises:
a point selector configured to select a point in a contour of the object from an image of the object in a predetermined posture;
a slope calculator configured to calculate a chamfer distance of the point in the contour;
a ridge point determiner configured to select at least one object ridge point satisfying a predetermined ridge condition of a chamfer distance and a distribution correction factor representing a distribution of chamfer distances among points in the contour; and
a ridge region extractor configured to determine a group consisting of the at least one object ridge point as the at least one ridge region.

18. The apparatus of claim 17, wherein a point in the contour satisfying an expression below selected under the predetermined ridge condition:

$$\frac{\sum_{i=1}^{N} Cham(X_i)}{N} < Cham(X_c) \cdot \delta_R,$$ [Expression]

where $X_c$, is coordinates of the point in the contour, N is a number of points in the contour having a distance of $Cham(X_c)$ from $X_c$, $Cham(X_i)$ is a chamfer distance of a point in the contour indicated by a variable i among the N points in the contour, and $\delta_R$ is a distribution correction factor representing a distribution of chamfer distances.

19. The apparatus of claim 17, wherein the joint motion tracking unit comprises:
 a head tracker configured to determine a head center position in a $t^{th}$ image among the temporally consecutive images based on coordinates of at least one head ridge point satisfying a predetermined head condition among the object ridge points;
 a torso tracker configured to determine torso joint positions in the $t^{th}$ image based on coordinates of at least one torso ridge point satisfying a predetermined torso condition among the object ridge points other than the at least one head ridge point; and a limb tracker configured to determine limb joint positions in the $t^{th}$ image based on coordinates of at least one limb ridge point satisfying a predetermined limb condition among the object ridge points other than the at least one head ridge point and the at least one torso ridge point.

* * * * *